United States Patent [19]

Horlbeck et al.

[11] 4,360,661
[45] Nov. 23, 1982

[54] PROCESS FOR THE REGENERATION AND FURTHER PROCESSING OF INACTIVE, LINEAR POLYALKYLENE TEREPHTHALATES

[75] Inventors: Gernot Horlbeck; Horst Heuer, both of Haltern; Hanns-Jörg Bax; Hans Jadamus, both of Marl, all of Fed. Rep. of Germany

[73] Assignee: Chemische Werke Huels AG, Marl, Fed. Rep. of Germany

[21] Appl. No.: 219,041

[22] Filed: Dec. 22, 1980

[30] Foreign Application Priority Data

Dec. 21, 1979 [DE] Fed. Rep. of Germany ....... 2951612
Sep. 5, 1980 [DE] Fed. Rep. of Germany ....... 3033469

[51] Int. Cl.$^3$ ............................................. C08G 63/26
[52] U.S. Cl. .................................. 528/272; 521/48.5; 528/274; 528/309; 528/480; 528/483; 528/490
[58] Field of Search ................. 260/2.3; 528/272, 274, 528/309, 480, 483, 490; 521/48.5

[56] References Cited

U.S. PATENT DOCUMENTS

| | | | |
|---|---|---|---|
| T873,013 | 4/1970 | Kibler | 528/272 |
| 3,222,299 | 12/1965 | MacDowell | 260/2.3 |
| 3,344,091 | 9/1967 | Russin et al. | 260/2.3 |
| 3,405,098 | 10/1965 | Heighton et al. | 528/309 |
| 3,453,240 | 9/1964 | Plaster et al. | 525/437 |
| 3,585,259 | 6/1971 | Lefferts et al. | 528/483 |
| 3,634,356 | 1/1972 | Tryon | 528/483 |
| 3,953,404 | 2/1974 | Borman et al. | 525/437 |
| 4,078,143 | 3/1978 | Malik et al. | 260/2.3 |
| 4,165,420 | 8/1979 | Rinehart | 528/272 |
| 4,238,593 | 12/1980 | Duh | 528/480 |
| 4,271,287 | 6/1981 | Shah | 528/309 |

FOREIGN PATENT DOCUMENTS

| | | |
|---|---|---|
| 2117748 | 10/1971 | Fed. Rep. of Germany . |
| 2162618 | 7/1972 | Fed. Rep. of Germany . |
| 905562 | 9/1962 | United Kingdom . |
| 1066162 | 4/1967 | United Kingdom . |
| 1251093 | 10/1971 | United Kingdom . |

*Primary Examiner*—Ronald W. Griffin
*Attorney, Agent, or Firm*—Millen & White

[57] ABSTRACT

A process for the regeneration and further condensation of a linear polyalkylene terephthalate, which is inactive due to recondensation treatment in the solid phase, and which has a viscosity number of at least 60 cc/g, the process being conducted in two stages, at an elevated temperature, in the presence of an alkanediol, comprises, in a first stage, treating the inactive polyalkylene terephthalate at a reaction temperature of 30°–80° C. below its melting point, with 0.3–3.5% by weight, based on the weight of the polyalkylene terephthalate, of an alkanediol whose boiling point under normal pressure is 20°–70° C. above the reaction temperature, in an inert gas stream, wherein the amount of inert gas passed through per hour, measured under standard conditions, corresponds to 0.3–2 times the gross reactor volume; and, in a second stage, condensing the polyalkylene terephthalate at a temperature of 5°–25° C. below its melting point in an inert gas stream, wherein the amount of inert gas passed through per hour, measured under standard conditions, corresponds to 2.5–10 times the gross reactor volume.

10 Claims, No Drawings

PROCESS FOR THE REGENERATION AND FURTHER PROCESSING OF INACTIVE, LINEAR POLYALKYLENE TEREPHTHALATES

CROSS-REFERENCE TO RELATED APPLICATIONS

This application is related to copending commonly assigned application Ser. No. 219,133, filed Dec. 22, 1980, filed on even date, which has a common inventive entity. The disclosure of the latter is incorporated by reference herein.

BACKGROUND OF THE INVENTION

The present invention relates to a process for regenerating and processing (further condensing; working up), an inactive, linear polyalkylene terephthalate having a viscosity number of at least 60 cc/g, in two stages, at an elevated temperature, in the solid phase, and in the presence of alkanediols.

Polyalkylene terephthalates, especially polyethylene terephthalate (PETP) and polybutylene terephthalate (PBTP) are excellent materials for the production of films, sheets, molded parts, etc. Especially for the manufacture of molded parts by injection molding and extrusion processes, polyalkylene terephthalate must exhibit a viscosity number of >100 cc/g.

Polyalkylene terephthalates are customarily produced by interesterification or esterification and subsequent polycondensation of terephthalic acid or its polyester-forming derivatives and an alkanediol, in the presence of catalysts (Sorensen and Campbell, Preparative Methods of Polymer Chemistry, Interscience Publishers Inc., N.Y. [1961]: 111-127; "Kunststoff-Handbuch" [Plastics Manual] VIII, C. Hanser Publishers, Munich [1973], whose disclosures are incorporated by reference herein.)

Using these processes, carried out in the melt, viscosities of a level required, for example, for injection molding and extrusion purposes, cannot be attained. Due to the temperature load, degradation reactions occur as early as the polycondensation stage, so that the desired high viscosity cannot be achieved.

To attain the desired, high viscosities, a solid-phase recondensation is, therefore, added to the process (British Pat. No. 1,066,162; U.S. Pat. No. 3,405,098). This is done by bringing the polyester, in granulated or powdered form, to temperatures lying approximately 10°-60° C. below the melting point. In this temperature range, the polyalkylene terephthalate is treated in an inert gas stream or under vacuum until the desired, high viscosity has been attained.

During this recondensation in the solid phase, the problem frequently occurs that a batch can be condensed only very gradually and only up to a viscosity lying below the desired, high level. Such a polyalkylene terephthalate is termed passive or inactive. (See DAS [German Published Application] No. 1,570,689, whose disclosure is incorporated by reference herein).

According to the state of the art, these inactive polyalkylene terephthalates are degraded by alcoholysis or hydrolysis back to low-molecular weight components which are then polycondensed in a new batch (DOS [German Unexamined Laid-Open Application] No. 1,420,366). According to the latter reference, for example, polyethylene terephthalate is degraded with dimethyl terephthalate and ethylene glycol in the presence of catalysts to form a low-viscosity interesterification mixture.

DAS No. 1,570,689 proposes to conduct the recondensation of polyethylene terephthalate after a treatment with ethylene glycol. In this process, the product must be soaked over several days in ethylene glycol. During the removal of excess ethylene glycol at a temperature above 230° C., the material tends to cake. If the ethylene glycol treatment is conducted at a high temperature (DAS No. 1,570,689, Example 3) in order to shorten the treatment time to a technically practicable length, the resultant volatility of ethylene glycol is too high to produce a reactivation of batches on a technical scale.

SUMMARY OF THE INVENTION

Accordingly, it is an object of the present invention to provide a process by which an inactive polyalkylene terephthalate can be regenerated and further worked up without the aforedescribed prior-art disadvantages.

Upon further study of the specification and appended claims, further objects and advantages of this invention will become apparent to those skilled in the art.

These objects have been attained by the present invention by providing a process comprising treating the polyalkylene terephthalate in a first stage, at a reaction temperature 30°-80° C. below the melting point of the polyalkylene terephthalate, with 0.3-3.5% by weight, based o the weight of the polyalkylene terephthalate, of an alkanediol, whose boiling point under normal pressure is 20°-70° C. above the reaction temperature, in an inert gas stream, wherein the amount of inert gas passed through per hour, measured under normal conditions (0° C. and 1013 mbar), corresponds to 0.3-2 times the gross reactor volume; and, in a second stage, condensing the polyalkylene terephthalate, at a temperature 5°-25° C. below the melting point of the starting material polyalkylene terephthalate, in an inert gas stream, wherein the amount of inert gas passed through per hour, measured under normal (standard) conditions corresponds to 2.5-10 times the gross reactor volume.

DETAILED DISCUSSION

Suitable alkanediols for use in this invention in the first stage are those of 2-6 carbon atoms in the carbon chain, such as, for example, ethylene glycol, 1,4-butanediol, 1,6-hexanediol, neopentyl glycol, 1,3-butanediol, or similar compounds. Preferably those diols are utilized which have also been employed as the diol component of the polyalkylene terephthalate. In any event, care must be taken that the temperature difference according to this invention between the boiling point of the diol and the reaction temperature is maintained. Preferred are diols whose boiling points are 30°-60° C. above the reaction temperature. The diols are preferably used in an amount of 1 to 2.5% by weight, based on the weight of polyalkylene terephthalate.

The reaction temperature of the first stage is preferably 35°-60° C. below the melting point of the polyalkylene terephthalate. In the second stage, a reaction temperature is preferred which is 10°-20° C. below the melting point of polyalkylene terephthalate.

The reaction is customarily conducted in both stages under normal pressure; insofar as necessary, it is also possible to operate under vacuum, especially in the second stage.

The inert gases suitable for the first and second stages especially include nitrogen which is customarily employed for polycondensation reactions. Other inert gases, however, can also be used. In the first stage, an amount of inert gas is passed through per hour which corresponds preferably to 0.5–1.5 times the gross reactor volume, measured under normal conditions. In the second stage, an amount of inert gas is preferred which corresponds, per hour, to 3–7 times the gross reactor volume. The volume data for the amounts of inert gas passed through the reactor do not refer to the respective reaction conditions but to normal conditions, i.e. 0° C. and 1013 mbar.

The process of this invention is controlled in the first stage so that the carboxy end group concentration decreases. Once the concentration reaches a minimum, or approximately a minimum, the first stage reaction is terminated and the polyalkylene terephthalate is treated further in accordance with the second stage. In terminating the first stage, it must be considered that the viscosity number of the polyester should not fall below 45–50 cc/g.

The residence time of the polyalkylene terephthalate in the first reaction stage is generally, in dependence on the aforementioned parameters, about 2–16, preferably 3–10 hours; in the second reaction stage the residence time is approximately 4–30, preferably 8–25 hours.

A suitable end point of the first stage of the process of this invention based upon the carboxy end group concentration can be determined by routine, preliminary experiments on small batches of the reaction mixture or based upon predictions which, in turn, are based upon standard routine experiments performed with other related reaction blends.

The process of this invention is basically suitable for all types of polyalkylene terephthalates which are inactive due to their pretreatment, i.e. the viscosity of which has not as yet reached the desired magnitude but which cannot be polycondensed to a higher viscosity number using conventional processes such as recondensation.

Such inactive polyalkylene terephthalates are described, for example, in DOS Pat. No. 1,420,366 and DAS Pat. No. 1,570,689, respectively, whose disclosures are incorporated by reference herein. These are polyesters, the final viscosities of which lie below the viscosity range necessary for their fields of application. Conventional measures for raising their viscosities have been ineffective, or are only slightly successful; however, even in these cases, it is also possible for a further degradation to occur whereby a drop in the viscosity number results.

The polyesters suitable for the process of this invention include polyalkylene terephthalates, preferably polyethylene terephthalate and polybutylene terephthalate. Up to 30 molar percent of the terephthalic acid in the polyalkylene terephthalates can be substituted by other conventional dicarboxylic acids. Examples of suitable dicarboxylic acids include isophthalic acid, phthalic acid, 1,4-cyclohexane-dicarboxylic acid, adipic acid, sebacic acid, and decanedicarboxylic acid.

The diol component of the polyterephthates is supplied by alkanediols of 2 up to possibly 12 carbon atoms in the carbon chain; preferred are ethylene glycol and 1,4-butanediol. Up to 30 mole% of the diol component of the respective polyalkylene terephthalate can be replaced by other diols, e.g. neopentyl glycol, 1,5-pentanediol, 1,6-hexanediol, 1,4- and 1,3-dimethylolcyclohexane, or 1,12-dodecanediol.

The term polyalkylene terephthalate as used in this invention also encompasses block copolyesters. Such products are described, for example, in Chimia 28 (9): 544–552 (1974) and in Rubber Chemistry and Technology 50: 688–703 (1977), whose disclosures are incorporated by reference herein. These block copolyesters contain, in addition to the above-mentioned aromatic dicarboxylic acids and alkanediols, a polyoxyalkylenediol having a molecular weight in the range from about 600 to 2500. Preferred polyoxyalkylene-diols are polyoxyethylene diol, polyoxypropylenediol, and polyoxytetramethylenediol. The proportion of polyoxyalkylenediols is in the range of 4 to 40% by weight, preferably 10–35% by weight, based on the weight of the mentioned block copolyester.

The viscosity number of the inactive polyalkylene terephthalates is usually from 60 to about 120 cc/g.

The linear polyalkylene terephthalates utilized in the process of this invention can contain auxiliary agents and additives. Suitable for such purposes are, for example, nucleating agents, flatting agents, flowing agents, or other processing agents, as well as pigments, fillers, and reinforcing substances, or similar materials.

Nucleating agents, flatting agents, flowing agents, or other processing aids are contained in the polyalkylene terephthalate in amounts of up to 6% by weight, preferably 0.2–3.5% by weight, based on the weight of the total mixture.

Pigments, fillers, and reinforcing agents or similar compounds are contained in the polyalkylene terephthalate in amounts of up to 60% by weight, preferably 1–50% by weight, based on the weight of the total mixture.

The auxiliary agents and additives can be present in the polyalkylene terephthalate at the beginning of the first stage of the condensation reaction of this invention, but can also be incorporated at any later point in time.

It is possible using the process of this invention to regenerate and process, in a reasonable time period and in technical, industrial magnitudes, polyalkylene terephthalates which have become inactive by the respective pretreatment. It is thus now feasible to recover polyesters which had become useless in their manufacturing processes and had to be discarded, and to pass them on to the customary further utilizations.

Moreover, the polyalkylene terephthalates produced in accordance with this invention display improved hydrolysis stability and melt stability. Thus, they are suitable, for example, for the production of monofilaments for filter fabrics which must meet high requirements regarding such properties. In general, the viscosity numbers of the final products are 110–200 cc/g and the carboxy end group concentrations are 10–40 eq/$10^6$ g.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples all temperatures are set forth uncorrected in degrees Celsius; unless otherwise indicated, all parts and percentages are by weight.

The parameters set forth in the specification and in the examples were determined using the following measuring techniques.

The melting point [$T_m$] is the melt maximum of the polyester determined by differential scanning calorimetry (DSC) (heating rate: 10° C./min).

The viscosity numbers [J] were measured in solutions of 0.23 g of polyalkylene terephthalate in 100 ml of phenol/1,1,2,2-tetrachloroethane (weight ratio 60:40) at 25° C.

The carboxy end group concentrations [COOH] were determined according to the method of H. A. Pohl (Analyt. Chem. 26: 1614-1954).

The hydrolysis stability of the polyesters was characterized by measuring the viscosity number after a 24-hour treatment of the finely ground material with water having a temperature of 130° C. in a pressure vessel.

The degradation refers to the hydrolysis stability of the polyesters; it is indicated as the percentage reduction of the viscosity number caused by the hydrolysis:

$$\frac{J_o - J_{Hydr.}}{J_o} \cdot 100$$

(($J_o$=initial viscosity number; $J_{Hydr}$=viscosity number after hydrolysis test).

The indicated amounts of nitrogen were measured under normal (standard) conditions.

Examples denoted by letters are not in accordance with this invention.

EXAMPLES 1-5 (TABLES 1 AND 2)

In a 0.5 m³ tumbler dryer, 120 kg of inactive polybutylene terephthalate ([J]: 95 cc/g; [COOH]: 100 eq/10⁶ g; [$T_m$]: 225° C.) is combined with 1,4-butanediol, heated in a nitrogen stream to 180° C., and left at this temperature for 5-10 hours. The nitrogen flow rate is then raised to 2 m³/h and the internal temperature is elevated to 210° C. Under these conditions the polyesters are recondensed for 8-24 hours.

EXAMPLE A (TABLE 2)

120 kg of a polybutylene terephthalate as in Examples 1-5 is recondensed, without the addition of 1,4-butanediol in a tumbler dryer, capacity 0.5 m³, at 210° C. and 2 m³/h N₂.

EXAMPLES 6-8 (TABLE 4)

In a 250-cc round flask, 30 g of inactive polybutylene terephthalate in granulated form ([J]: 95 cc/g; [COOH]: 100 eq/10⁶ g; [$T_m$]: 225° C.) is combined with alkanediol and treated under agitation. Thereafter, the specimen is heated to 210° C. and recondensed according to Examples 1-5.

EXAMPLES 9-12 (TABLE 5)

30 g of inactive granulated polyethylene terephthalate ([J]: 90 cc/g; [COOH]: 81 eq/10⁶ g; [$T_m$]: 254° C.) is introduced into a 250-cc round flask, combined with alkanediol, and treated under agitation. Thereafter, the temperature is raised to 235° C. and the specimen recondensed at this temperature for 16-20 hours under a nitrogen stream.

EXAMPLES B AND C (TABLE 5)

Respectively, 30 g of granulated polyethylene terephthalate, as also utilized for Examples 9-12, is recondensed without/with addition of alkanediol under otherwise identical conditions.

EXAMPLE 13

120 kg of inactive block copolyester ([J]: 84 cc/g; [COOH]: 93 eq/10⁶ g; [$T_m$]: 215° C.), made up of 57% by weight of terephthalic acid, 30% by weight of 1,4-butanediol, and 13% by weight of polyoxytetramethylenediol with $\overline{M}_n$=1000, is combined in a 0.5 m³ tumbler dryer with 1.8 kg of 1,4-butanediol and then condensed in two stages.

First Stage: 8 h/180° C./0.5 m³ N₂/h
Second Stage: 24 h/200° C./2 m³ N₂/h/40 mbar Thereafter, the viscosity number [J] is 150 cc/g and the carboxy end group concentration [COOH] is 24 eq/10⁶ g.

EXAMPLE 14

150 kg of inactive block copolyester ([J]: 105 cc/g; [COOH]: 85 eq/10⁶ g; [$T_m$]: 209° C.), made up of 46% by weight of terephthalic acid, 22% by weight of 1,4-butanediol, and 32% by weight of polyoxytetramethylenediol with $\overline{M}_n$=1000, is combined with 1.2 kg of 1,4-butanediol and then condensed in two stages.

First Stage: 8 h/175° C./0.5 m³ N₂/h
Second Stage: 24 h/195° C./2 m³ N₂/h/40 mbar Thereafter, the viscosity number [J] is 173 cc/g and the carboxy end group concentration [COOH] is 22 eq/10⁶ g.

TABLE 1

| | Process Features in the First Stage | | |
|---|---|---|---|
| Example | 1,4-Butanediol Addition [% by Weight] | N₂ Flow Rate [m³/h] | Treatment Period [h] |
| 1 | 1.0 | 0.50 | 10 |
| 2 | 1.5 | 0.50 | 10 |
| 3 | 1.5 | 0.75 | 10 |
| 4 | 1.5 | 0.50 | 5 |
| 5 | 2.0 | 0.75 | 10 |

TABLE 2

| | Progression of Polycondensation in the Second Stage | | | | | |
|---|---|---|---|---|---|---|
| | J [cc/g] After a Polycondensation Time of | | | [COOH] (eq/10⁶ g) After a Polycondensation Time of | | |
| Example | 8 h | 16 h | 24 h | 8 h | 16 h | 24 h |
| 1 | 120 | 137 | 139 | 40 | 41 | 40 |
| 2 | 111 | 144 | 159 | 25 | 26 | 27 |
| 3 | 119 | 143 | 151 | 28 | 27 | 26 |
| 4 | 113 | 134 | 156 | 26 | 26 | 24 |
| 5 | 98 | 122 | 145 | 20 | 19 | 18 |
| A | 95 | 94 | 94 | 100 | 102 | 105 |

TABLE 3

| Hydrolysis Stability of the Processed Polybutylene Terephthalates | | | |
|---|---|---|---|
| | J [cc/g] | | |
| Example | Before Hydrolysis | After | Degradation [%] |
| 1 | 139 | 97 | 30 |
| 2 | 159 | 128 | 19.5 |
| 3 | 151 | 130 | 14 |
| 4 | 157 | 130 | 17 |
| 5 | 145 | 142 | 2 |
| A | 95 | 52 | 45 |

TABLE 4

| | | | First Stage | | | Second Stage | | | |
|---|---|---|---|---|---|---|---|---|---|
| | | | Treatment | | N$_2$ Flow | Treatment | | N$_2$ Flow | |
| Example | Alkanediol | Addition [% by Wt] | Temp. [°C.] | Time [h] | Rate [l/h] | Temp. [°C.] | Time [h] | Rate [l/h] | J* [cc/g] |
| 6 | 1,6-Hexanediol | 2 | 188 | 6 | 0.25 | 210 | 6 | 1.00 | 154 |
| 7 | 1,3-Butanediol | 3 | 170 | 8 | 0.20 | 210 | 8 | 0.75 | 186 |
| 8 | 1,3-Butanediol | 1 | 170 | 6 | 0.20 | 210 | 8 | 0.75 | 182 |

*After completion of working-up step

TABLE 5

| | | | First Stage | | | Second Stage | | | |
|---|---|---|---|---|---|---|---|---|---|
| | | | Treatment | | N$_2$ Flow | Treatment | | N$_2$ Flow | |
| Example | Alkanediol | Addition [% by Wt] | Temp. [°C.] | Time [h] | Rate [l/h] | Temp. [°C.] | Time [h] | Rate [l/h] | J* [cc/g] |
| 9 | 1,4-Butanediol | 2 | 200 | 8 | 0.25 | 235 | 20 | 1.00 | 110 |
| 10 | 1,4-Butanediol | 2 | 210 | 6 | 0.25 | 235 | 20 | 0.75 | 115 |
| 11 | 1,4-Butanediol | 1 | 200 | 3 | 0.20 | 235 | 20 | 0.75 | 113 |
| 12 | 1,6-Hexanediol | 1 | 200 | 7 | 0.25 | 235 | 16 | 1.00 | 111 |
| B | — | — | — | — | — | 235 | 20 | 1.00 | 88 |
| C | Ethylene Glycol | 2 | 200 | 8 | 0.25 | 235 | 24 | 1.00 | 93 |

*After completion of working-up step

EXAMPLE 15

100 kg of inactive block copolyester ([J]: 85 cc/g; [COOH]: 96 eq/10$^6$ g; [T$_m$]: 212° C.), made up of 54% by weight of terephthalic acid, 28% by weight of 1,4-butanediol, and 18% by weight of polyoxytetramethylenediol with $\overline{M}_n = 1000$, is combined with 1.5 kg of 1,4-butanediol in a 0.5 m$^3$ tumbler dryer and then condensed in two stages.

First Stage: 8 h/175° C./0.5 m$^3$ N$_2$/h
Second Stage: 16 h/200° C./2 m$^3$ N$_2$/h/40 mbar Thereafter, the viscosity number [J] is 176 cc/g and the carboxy end group concentration [COOH] is 28 eq/10$^6$ g.

EXAMPLE D 65 kg of inactive block copolyester ([J]: 84 cc/g; [COOH]: 71 eq/10$^6$ g; [T$_m$]: 215° C.), made up of 57% by weight of terephthalic acid, 30% by weight of 1,4-butanediol, and 13% by weight of polyoxytetramethylenediol with $\overline{M}_n = 1000$, is condensed in the solid phase without the addition of 1,4-butanediol in a 0.5 m$^3$ tumbler dryer.

Conditions: 24 h/200° C./2 m$^3$ N$_2$/h/40 mbar

Thereafter, the viscosity number [J] is 96 cc/g and the carboxy end group concentration [COOH] is 68 eq/10$^6$ g.

EXAMPLE 16

In a 0.5 m$^3$ tumbler dryer, 150 kg of inactive polybutylene terephthalate reinforced with 30% by weight of cut glass fibers ([J]: 115 cc/g; [COOH]: 96 eq/10$^6$ g; [T$_m$]: 225° C.) is combined with 1.88 kg ($\triangleq$1.25% by weight/mixture) of 1,4-butanediol, heated in a nitrogen stream (0.5 m$^3$/h) to 180° C., and then left at this temperature for 10 hours. Then the nitrogen flow rate is raised to 2 m$^3$/h and the internal temperature is increased to 210° C. Under these conditions, the material is recondensed. After 16 hours the viscosity number [J] is 165 cc/g, and the carboxy end group concentration [COOH] is 19 eq/10$^6$ g.

The degradation of the viscosity number after the hydrolysis test is 9%.

EXAMPLE E 150 kg of the reinforced polybutylene terephthalate characterized in greater detail in Example 16 is recondensed in a 0.5 m$^3$ tumbler dryer, without the addition of 1,4-butanediol, at 210° C. and 2 m$^3$/h N$_2$. After 16 hours, the viscosity number is unchanged; [COOH] is 104 eq/10$^6$ g.

The degradation of the viscosity number after the hydrolysis test is 53%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the regeneration and further condensation of a linear polyalkylene terephthalate which is inactive after recondensation and which has a viscosity number of at least 60 cc/g as measured in a solution of 0.23 g of polyalkylene terephthalate in 100 ml of phenol/1,1,2,2-tetrachloroethane (weight ratio 60:40) at 25° C., the process being conducted in the solid phase, in two stages and at an elevated temperature, in the presence of an alkanediol, and comprising, in a first stage, treating the inactive polyalkylene terephthalate at a reaction temperature of 30°–80° C. below its melting point, with 0.3–3.5% by weight, based on the weight of the polyalkylene terephthalate, of an alkanediol whose boiling point under normal pressure is 20°-70° C. above the reaction temperature, in an inert gas stream, wherein the amount of inert gas passed through per hour, measured under standard conditions, corresponds to 0.3-2 times the gross reactor volume and wherein the first stage is conducted until the polyalkylene terephthalate has achieved essentially its minimum carboxy end group concentration; and in a second stage, condensing the polyalkylene terephthalate at a temperature of 5°-25° C. below its melting point in an inert gas stream, wherein the amount of inert gas passed through per hour, measured under standard conditions, corresponds to 2.5-10 times the gross reactor volume.

2. A process of claim 1 wherein the first and second stages are carried out in the same reactor and the second stage is effected by continuing the first stage with said increased inert gas flow and said increased temperature.

3. A process of claim 2, wherein the polyalkylene terephthalate is treated in the first stage at a temperature 35°-60° C. below its melting point.

4. A process of claim 2, wherein the polyalkylene terephthalate is treated in the first stage with 1.2-2.5% by weight, based on the weight of the polyalkylene terephthalate, of an alkanediol.

5. A process of claim 1, wherein the polyalkylene terephthalate is treated in the first stage with an alkanediol whose boiling point under normal pressure, is 30°-60° C. above the reaction temperature.

6. A process of claim 2, wherein in the first stage, an amount of inert gas is passed through which, measured under standard conditions, corresponds to 0.5-1.5 times the gross reactor volume.

7. A process of claim 2, wherein the polyalkylene terephthalate is condensed in the second stage at a temperature of 10°-20° C. below its melting point.

8. A process of claim 2, wherein, in the second stage, an amount of inert gas is passed through which, measured under standard conditions corresponds to 3 to 7 times the gross reactor volume.

9. A process of claim 2, wherein the inert gas is nitrogen.

10. A process of claim 2, wherein the alkanediol used in the first stage corresponds to the alkylene portion of the polyalkylene terephthalate.

* * * * *

UNITED STATES PATENT AND TRADEMARK OFFICE
CERTIFICATE OF CORRECTION

PATENT NO. : 4,360,661
DATED : November 23, 1982
INVENTOR(S) : Gernot Horlbeck et al It is certified that error appears in the above-identified patent and that said Letters Patent is hereby corrected as shown below:

Column 9, line 23: reads "terephthalate is treated in the first stage with 1.2-2.5%"

Should read -- terephthalate is treated in the first stage with 1-2.5% --.

Signed and Sealed this

Fifteenth Day of March 1983

[SEAL]

Attest:

GERALD J. MOSSINGHOFF

*Attesting Officer*  *Commissioner of Patents and Trademarks*